United States Patent
Yamada et al.

[11] Patent Number: 6,004,462
[45] Date of Patent: Dec. 21, 1999

[54] FILTER ELEMENT

[75] Inventors: Katsuhisa Yamada, Okazaki; Kingo Okada, Kariya; Kouji Izutani, Nagoya; Kenji Okabe, Kariya, all of Japan

[73] Assignee: Nippondenso Co., Ltd., Kariya, Japan

[21] Appl. No.: 08/671,379

[22] Filed: Jun. 27, 1996

[30] Foreign Application Priority Data

Jul. 13, 1995 [JP] Japan .................................. 7-177321

[51] Int. Cl.⁶ .................................................. B01D 39/16
[52] U.S. Cl. ...................... 210/243; 210/504; 361/212; 361/215; 361/220
[58] Field of Search ..................... 361/212, 215, 361/220; 210/243, 504; 204/302

[56] References Cited

U.S. PATENT DOCUMENTS

| | | | |
|---|---|---|---|
| 4,196,464 | 4/1980 | Russell | 361/215 |
| 5,085,773 | 2/1992 | Danowski | 210/446 |
| 5,154,829 | 10/1992 | Degen et al. | 210/500.38 |
| 5,164,084 | 11/1992 | Danowski et al. | 210/243 |
| 5,380,432 | 1/1995 | Brandt | 210/243 |
| 5,524,673 | 6/1996 | Noone et al. | 361/215 |

FOREIGN PATENT DOCUMENTS 50-38861  4/1975  Japan .

*Primary Examiner*—W. L. Walker
*Attorney, Agent, or Firm*—Nixon & Vanderhye P.C.

[57] ABSTRACT

Resin having a susceptibility to electrostatic charge which is opposite in polarity to the susceptibility to electrostatic charge of a filter sheet or member forming a filter element is impregnated into the filter member. For example, when the filter member is composed of polyester of 50–70 weight percentage and glass fiber of 5–25 weight percentage as well as pulp of 15–35 weight percentage, resin composed of phenol resin of 5–20 weight percentage and melamine resin of 80–95 weight percentage is impregnated into the filter member so that the susceptibility to electrostatic charge of the filter member can be neutralized. Thus, static electricity generated by friction between the filter element and fuel flowing therethrough can be controlled.

24 Claims, 4 Drawing Sheets

| | FUNCTIONAL GROUP | POLARITY OF CHARGE |
|---|---|---|
| PHENOL | −OH | ⊖ |
| MELAMINE | −NH₂ | ⊕ |
| VINYL ACETATE | −COOH | ⊖ |

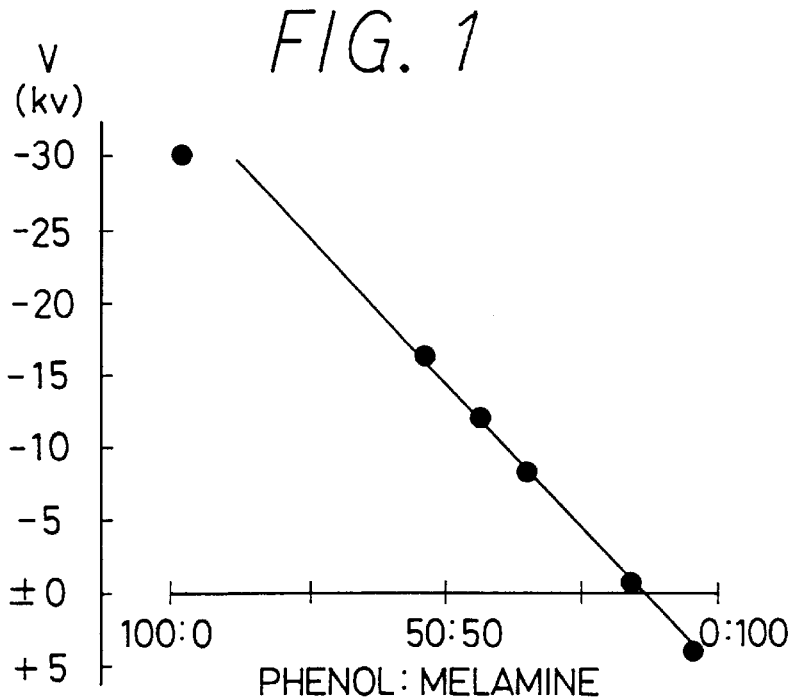
FIG. 1
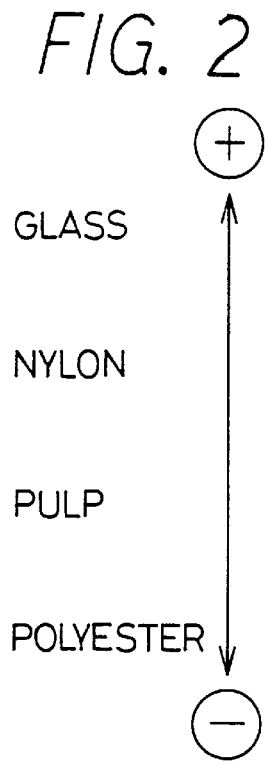
FIG. 2
FIG. 3
|  | FUNCTIONAL GROUP | POLARITY OF CHARGE |
|---|---|---|
| PHENOL | −OH | ⊖ |
| MELAMINE | −NH₂ | ⊕ |
| VINYL ACETATE | −COOH | ⊖ |

FILTER ELEMENT

BACKGROUND OF THE INVENTION

1. Field of the Invention

The present invention relates to a filter element which is used in a fuel filter for a vehicle to prevent generation of static electricity.

2. Description of Related Art

Since static electricity is generated in a filter element when fuel is filtered by a filter element, various techniques for preventing the static electricity have been proposed.

For example, a filtering material for a fuel filter is disclosed in JP-A 50-38861. The filter sheet is composed of pulp mixed with acryl type fiber which is impregnated with composite resin to form a solid filter element.

Generally, when the fuel filter element formed of filter sheet is held in all insulating resin case, static electricity is generated when fuel is passing through the filter element. Therefore, the above publication proposes a filter member composed of pulp which is charged with minus electricity and acryl type fiber which is charged with plus electricity when fuel passes through the filtering material so that they neutralize the static electricities of minus and plus at the same time, thereby preventing generation of the static electricity even if the filter element is held in an insulating case.

The above conventional filter member is formed by the following steps. That is, fiber of cotton linter pulp mixed with acryl type fiber of 10 weight percentages is formed into a sheet having a specified thickness, permeability and porosity and, thereafter, the sheet is hardened by adding phenol resin. The acryl type fiber in this case is mixed as a composition to be charged with plus electricity for neutralizing the fiber of the cotton linter pulp which is charged with minus electricity when it filtrates fuel.

However, in the conventional filter element described above, it is difficult to provide a filter element which satisfies both the desired filter performance and the desired anti-static effect.

SUMMARY OF THE INVENTION

In view of the foregoing problems of the prior art, it is an object of the present invention to provide a filter element which can satisfy both the desired filter performance and the desired anti-static effect.

Another object of the present invention is to provide a filter element in which the susceptibility to electrostatic charges is neutralized by impregnating or coating a filter member with resinous material thereby to prevent generation of static electricity.

According to the present invention, a kind of resin having a susceptibility to electrostatic charge which is opposite in the polarity to the susceptibility to electrostatic charge of the filter member is impregnated into or coated on the filter member. Therefore, a filter element able to meet the desired engine performance can be easily provided.

According to the present invention, the resin to be impregnated into or coated on the filter member is composed of a monomer having any one functional group of hydroxy group, carboxyl group or amino group. The resin which is composed of the monomer having one of the above-described functional groups is impregnated into or coated or the filter member so that the susceptibility to electrostatic (charge of the filter member is neutralized and static electricity is not generated (i.e., it is neutralized).

According to the present invention, a plurality of different kinds of resin can be impregnated into or coated on the filter member. For example, phenol resin and melamine resin can be impregnated into or coated on the filter member. By changing the ratio of phenol resin which has a susceptibility to minus electrostatic charge and melamine resin which has a susceptibility to plus electrostatic charge, static voltage generated from the filter element can be effectively prevented.

According to the present invention, the filter member is composed of polyester of 50–70 weight percentage, glass fiber of 5–25 weight percentage and pulp of 15–35 weight percentage, the resin impregnated into or coated on the filter member is composed of phenol resin of 5–20 weight percentage and melamine resin of 80–95 weight percentage.

BRIEF DESCRIPTION OF THE DRAWINGS

Other objects, features and characteristics of the present invention as well as the functions of related parts of the present invention will become clear from a study of the following detailed description, the appended claims and the drawings. In the drawings:

FIG. 1 is a graph showing relationship between electrostatic potential and the ratio of composition of phenol resin and melamine resin;

FIG. 2 is a chart showing relationship between four kinds of fiber material and susceptibility to electrostatic charge;

FIG. 3 is a chart showing relationship between polarity of the electrostatic charge and three kinds of functional groups: phenol resin, melamine resin and vinyl acetate resin;

DETAILED DESCRIPTION OF PREFERRED EMBODIMENTS

Preferred embodiment of the present invention are described hereinafter with reference to the accompanying drawings.

Filter fiber for a filter member which is composed of polyester, glass fiber, pulp, etc. and contained in a tank with liquid is picked up from the tank and formed into a sheet of paper as a filter base sheet. Then, a certain amount of resinous material is impregnated into the filter base sheet so that the filter base sheet can be deformed easily and a napping can be prevented when forming the filter base sheet into a filter member or filter sheet of a desired shape.

The susceptibility to electrostatic charge of the filter sheet nearly corresponds to zeta($\zeta$)-potential of the fiber. Further, the zeta-potential of the fiber changes with the kind of functional group of the fiber. For example, polyester fiber having a carboxyl group as well as minus zeta-potential tends to be charged with minus electricity. Pulp having a hydroxy group as well as minus zeta-potential tends to be charged with minus electricity. And nylon having an amino group and plus zeta-potential tends to be charged with plus electricity, as shown in FIG. 2. In case the fiber is made of polyester of 60 weight percentage, glass fiber of 15 weight percentage and pulp of 25 weight percentage, the filter base sheet has a susceptibility to electrostatic charge of minus as a whole.

It is found that the susceptibility to electrostatic charge of the resin which is impregnated into the filter base sheet also depends on the kind of functional group of the resin. For example, as shown in FIG. 3, phenol resin having a hydroxy group tends to be charged with minus electricity. Vinyl acetate resin having a carboxyl group tends to be charged with minus electricity. And melamine resin having an amino group tends to be charge with plus electricity.

Figure 4:
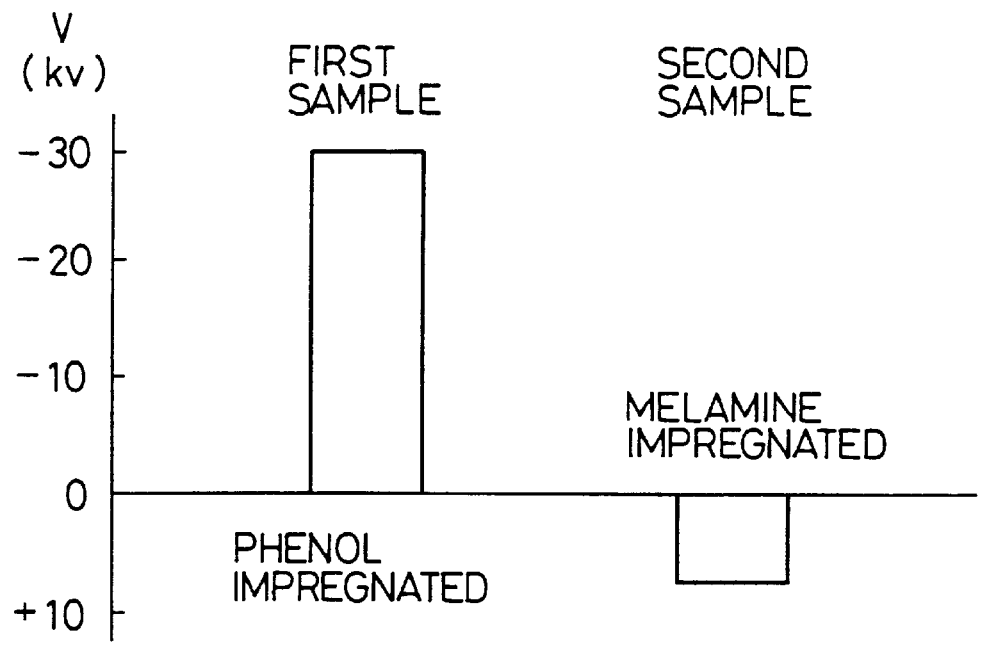
FIG. 4 is a graph showing generated potential of static electricity of the filter element with phenol resin impregnated therein and melamine resin into a filter base sheet.

FIG. 4 shows effects of the resin impregnated into a filter member on its susceptibility to electrostatic charge. Two samples of the filter member are formed from filter fiber which is composed of polyester of 60 weight percentage, glass fiber of 15 weight percentage and pulp of 25 weight percentage and are formed into respective sheets of $61g/m^2$ METSUKE amount. Then, phenol resin is impregnated into a first sample and melamine resin is impregnated into a second sample, and they are stiffened to become pleated filter sheets. Here, the amount of phenol resin impregnated in the first sample is $7g/m^2$, the amount of melamine resin impregnated in the second sample is $7g/m^2$. The generated electric potential is measured when gasoline is filtered at a flow rate of 2 liter/min.

As shown in FIG. 4, the generated electric potential of the first sample is nearly −30kV and the generated electric potential of the second sample is nearly +8kV. It is noted that the susceptibility to electrostatic charge of the filter element changes with the susceptibility to electrostatic charge of an impregnated resin although the fiber has the same composition. Thus, by controlling the ratio of phenol resin and melamine resin, electrostatic charge of the filter sheet can be neutralized so that the generated electric potential can be reduced to nearly zero.

In order to find out the best composition of resin to be impregnated, the susceptibility to electrostatic charge of the fiber, the relationship between the ratio of phenol resin and melamine resin and the generated electric potential are measured. The filter base sheet is made from fiber of $61g/m^2$ METSUKE amount (weight of the filter sheet per one square meter). In this filter base sheet, a mixture of phenol resin of $7g/m^2$ and melamine resin of $7g/m^2$ is respectively impregnated, and the base sheet is stiffened to form a filter sheet or filter member, which is folded and formed into a honeycomb shape. The electric potential of the filter sheet is generated when it filters gasoline at a flow rate of 2 liter/min, as shown in FIG. 1. FIG. 1 shows that when the composition of the filter fiber is polyester of 60 weight percentage, glass fiber of 15 weight percentage, and pulp of 25 weight percentage, the generated electric potential of the filter element becomes smallest when the ratio of phenol resin to melamine resin is 15 : 85.

Figure 5:
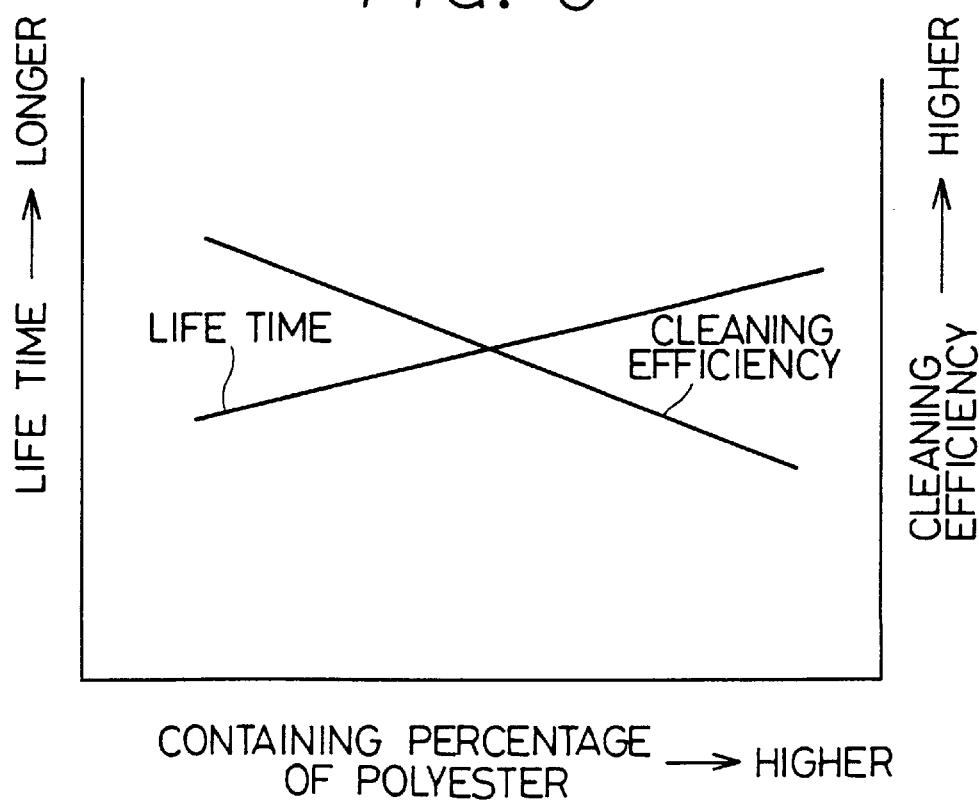
FIG. 5 is a graph showing the relationship between the polyester percentage contained in the filter member (or filter fiber sheet) and life of the filter element and, also, cleaning efficiency.
Figure 6:
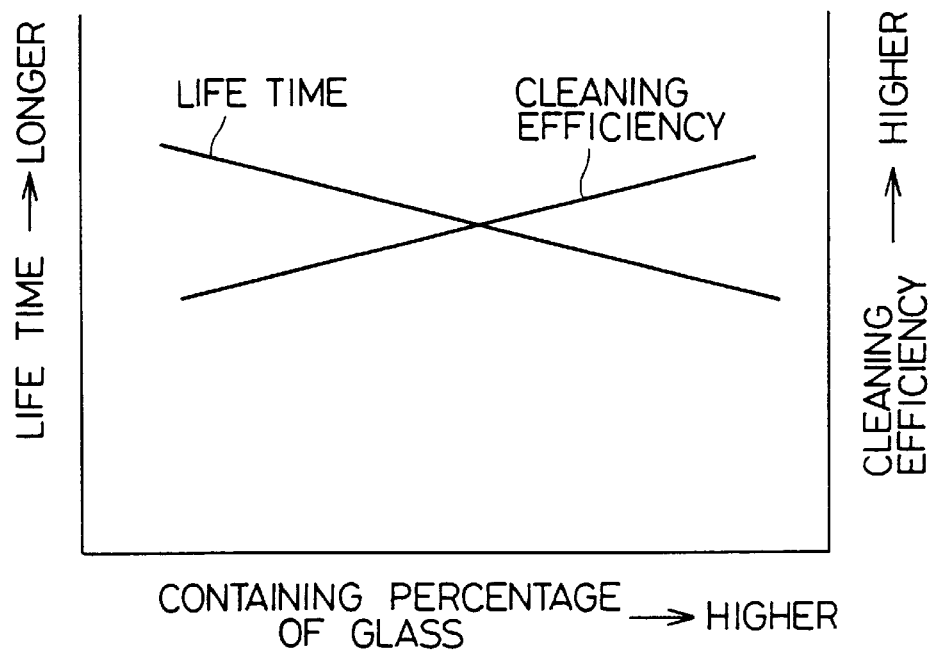
FIG. 6 is a graph showing the relationship between the glass fiber percentage contained in the filter member and life of the filter element and also, cleaning efficiency.

Therefore, the best composition of filter fiber can be selected freely according for a particular performance required to the filter element. For example, a relationship between life of the filter element and cleaning efficiency as well as the percentage of polyester in the filter fiber, as shown in FIG. 5. Further, there is a relationship between life of the filter element and cleaning efficiency and the percentage of glass fiber contained in the filter fiber as shown in FIG. 6. Because the susceptibility to electrostatic charge of the filter sheet is different with the composition of the filter fiber, the ratio of phenol resin and melamine resin has to be changed. It is found that the best composition of the filter fiber in this instance is polyester in a range of 50–70 weight percentage, glass fiber in a range of 5–25 weight percentage, and pulp in a range of 15–35 weight percentage and that the phenol resin of 5–20 weight percentage and melamine resin of 80–95 percentage are impregnated into the filter sheet.

Besides phenol resin and melamine resin, different kinds of resin having functional groups such as a hydroxy group, an amino group, a carboxyl group or the like can be used as the resin to be impregnated into the filter sheet. Further, when the electrostatic charge of the filter sheet can be neutralized by using only one kind of resin, one kind of resin may be impregnated therein. A plurality of different kinds of resin having different susceptibility to electrostatic charge (like phenol resin) and melamine resin may be mixed before impregnating into the filter base sheet in a certain ratio.

In a filter element according to an embodiment of the present invention, susceptibility to electrostatic charge which is different with various compositions of the filter fiber is neutralized by impregnating the resin into the filter base member or the filter member so that static electricity generated from the filter element can be neutralized. Therefore, even if the filter fiber is selected so as to optimize filter performance or mechanical strength, generation of static electricity can be prevented by impregnating suitable resin(s).

The same effect of neutralization can be obtained likewise by coating the resin on the filter member (i.e, the effect is) substantially the same as with impregnation).

The filter element of the present invention is suitable for a fuel filter for an internal combustion engine. The fuel filter can be located in a passage supplying fuel from a fuel pump to the internal combustion engine or a passage returning excess fuel from the internal combustion engine to the fuel tank. The position of the fuel filter may be inside or outside of the fuel tank. Further, when the filter element is held in a filter housing to form the fuel filter, the filter housing can be integrated with a resinous cap of the fuel tank.

Figure 7:
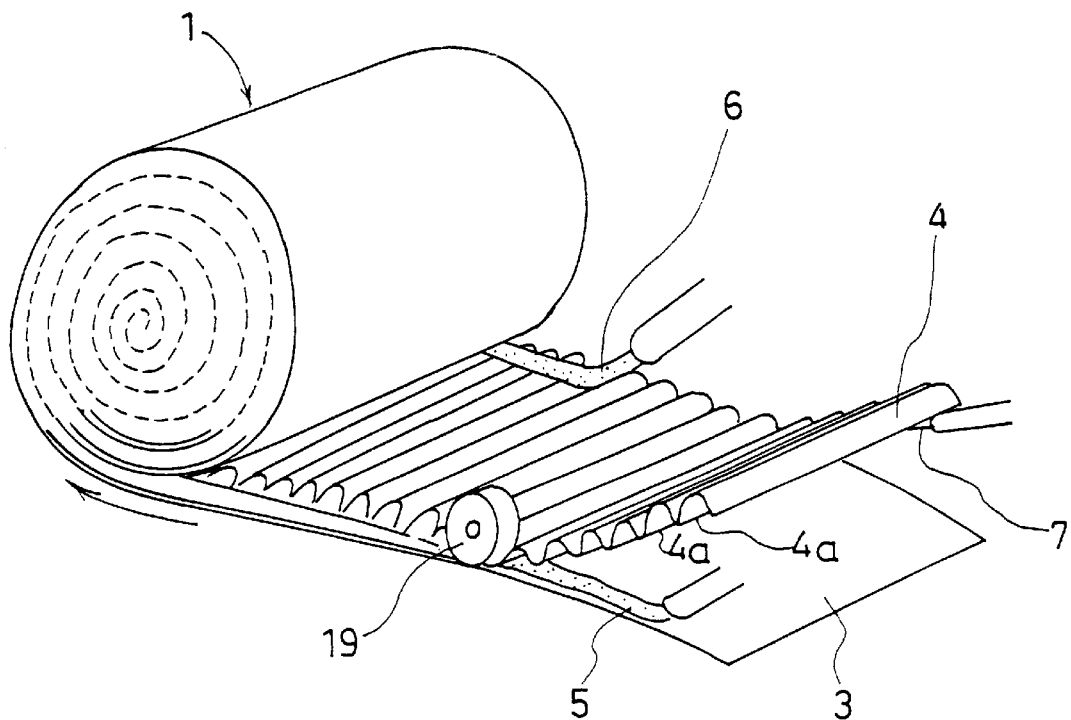
FIG. 7 is a perspective view showing a manufacturing step of the filter element according to an embodiment of the present invention.

Here, a method of forming the filter element for an embodiment of the present invention will be described with reference to FIGS. 7 and 8.

A long wave-plate filter sheet 4 is put on a long flat filter sheet 3, and they are rolled up in a longitudinal direction to form the filter element 1. The filter fiber is formed into the filter base sheet as described before. Then, a mixture of phenol resin and melamine resin is impregnated in the filter base sheet, which is stiffened as described before to form the flat filter sheet 3 and the waved filter sheet 4. In FIG. 7, upstream side for fuel is located at the right-upper side of cylindrical portion of the filter element 1. Fuel is introduced therefrom and filtered by the filter element 1 and discharged from the left-lower side which is the downstream side of the filter element 1. Further, in FIG. 8, the upstream side of fuel is located at the upper side and the downstream side is located at the lower side.

The waved filter sheet 4 is obtained from a flat filter sheet which is wave-shaped by a wave-shaping roller (not shown). The waved filter sheet 4 is put on the flat filter sheet 3, and sealing material 5 (e.g., of a hot-melt type adhesive type) is smeared on the interface of the flat filter sheet 3 and the waved filter sheet 4 at the downstream side. Then it is pressed by a roller 19 and heated. In this step, the heating temperature is 225° C., the pressure is 7kgf/cm² and the applied time is no less than 1.5 seconds. The hot-melt type adhesive 7 is also applied to the interface of the flat and waved filter sheets 3 and 4 at an upstream side thereof. As a result, the wave ridges 4a of the waved filter sheet 4 are adhered to the flat filter sheet 3 by the adhesive 7 both at the upstream and the downstream sides. Then, the composite sheets are rolled up to form the cylindrical filter element 1 with the waved filter sheet 4 being disposed radially inside. Seal material 6 composed of hot-melt type adhesive is filled into spaces between the waved filter sheet 4 and the radially inside flat filter sheet 3 at the upstream side so that the waved filter sheet 4 is connected hermetically with the flat filter sheet 3.

Figure 8:
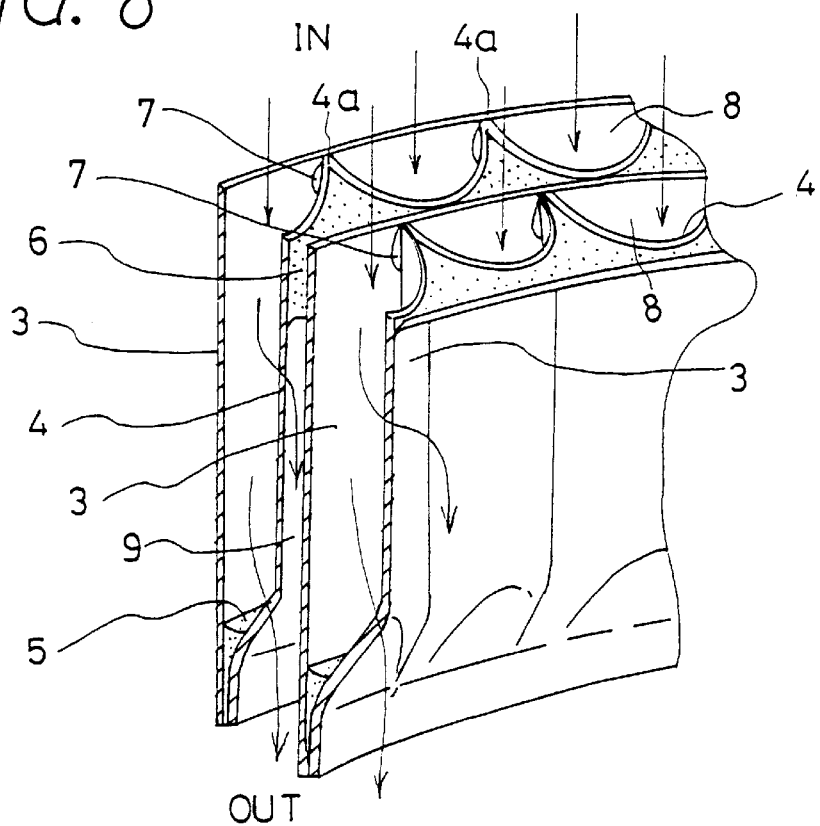
FIG. 8 is a fragmented perspective view of the filter element according to an embodiment of the present invention.

As shown in FIG. 8, fuel flows from the upper side of FIG. 8 to inlet passages 8 which are formed between the waved sheet 4 and the radially outside flat filter sheet 3 into outlet passages 9 which are formed between the waved sheet and the radially inside flat sheet 3 through the flat filter sheet 3 or the waved filter sheet 4 in the arrowed direction of FIG. 8. Thus, the fuel is filtered by the flat filter sheet 3 and the waved filter sheet 4.

Figure 9:
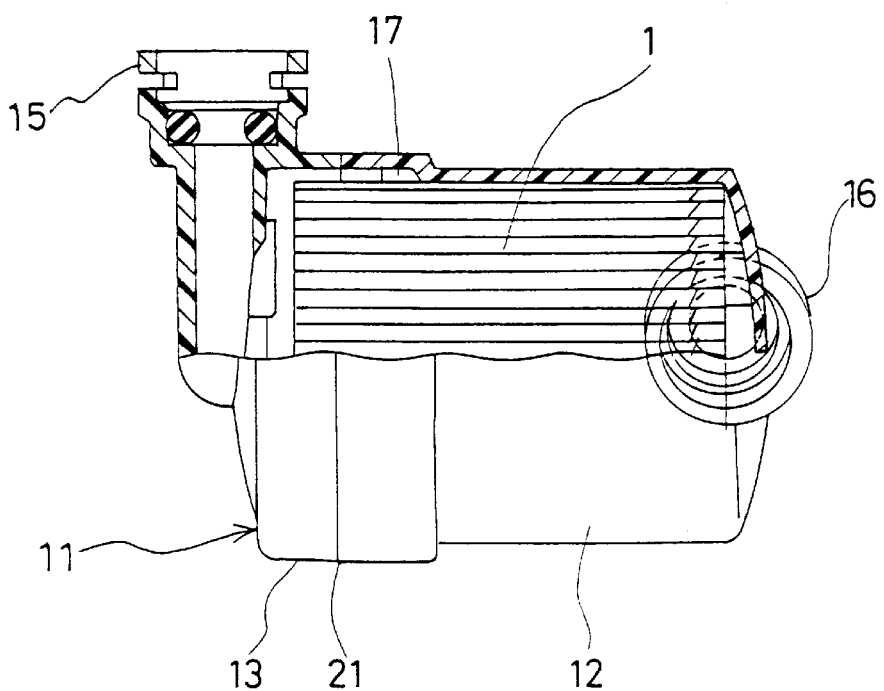
FIG. 9 is a partial cross-sectional side view showing a fuel filter which uses a filter element according to an embodiment of the present invention.

Next, the structure of a fuel filter using the filter element 1 is described with reference to FIG. 9.

In the fuel filter 11, the filter element 1 is held in a housing 12 which is made of an insulating resinous material and in a cap 13 made of resinous material. An outlet 16 is located in one end portion of the housing 12, an inlet 15 is located in the cap 13. The resin housing 12 and the cap 13 is fluid-tightly welded or bonded along the interface portion 21. A space between the filter element 1 and the resin housing 12 is fluid-tightly sealed by a seal member 17.

In the fuel filter 11, because resin which can neutralize the susceptibility to electrostatic charge of the filter sheet is impregnated in the above-described filter element 1, static electricity generated by friction between the filter element 1 and fuel flowing through the filter element 1 can be prevented. Thus, although the housing 12, the cap 13 and other parts of the fuel filter 11 are made of an insulating resinous material, the storage of static electricity can be prevented.

Instead of the insulating resinous material, conductive material such as carbon-contained resinous material can be used in the housing 12 and the cap 13. In this case, static voltage generated from the filter element can be further decreased.

Further, instead of the above-described rolled honeycomb type element, a different-shaped honeycomb type element or a pleated type element, a cup shaped element or a block shaped element may be used. Further, a plurality of small filter elements of spherical shape, cylindrical shape or the like may be filled in a case as the fuel filter element.

While the above embodiments give detailed descriptions of the fuel filter, the filter of the present invention can be used in a wide variety of applications as gas filters, liquid filters or the like.

What is claimed is:

1. A filter element comprising:
   a filter member having a susceptibility to electrostatic charge and having resin impregnated into said filter element to stiffen it,
   wherein said resin has a susceptibility to electrostatic charge which is opposite to said susceptibility of electrostatic charge of said filter member.

2. A filter element as in claim 1 wherein said resin is compose of a monomer having any one of the functional groups consisting of: a hydroxy group, a carboxyl group and an amino group.

3. A filter element as in claim 1 wherein said filter element is held in a resin case of a fuel filter.

4. A filter element comprising:
   a filter member having susceptibility to electrostatic charge,
   wherein resin having a susceptibility to electrostatic charge which is opposite in polarity to said susceptibility to electrostatic charge of said filter member is impregnated into said filter member;
   wherein said resin is composed of a monomer having any one of the functional group consisting of: a hydroxy groups, a carboxyl group and an amino group; and
   wherein a plurality of kinds of said resin are impregnated into said filter member.

5. A filter element as in claim 4 wherein said resin is composed of phenol resin and melamine resin.

6. A filter element as in claim 4 wherein:
   said filter member is composed of polyester fiber of 50–70 weight percentage, glass fiber of 5–25 weight percentage and pulp of 15–35 weight percentage, and
   said resin is composed of phenol resin of 5–20 weight percentage and melamine resin of 80–95 weight percentages.

7. A filter comprising:
   a case having an inlet and an outlet;
   a filter element disposed in said case;
   said filter element including a liquid filter member having a susceptibility to electrostatic charge when filtering, and resin being coated on said filter element to stiffen it;
   wherein said resin has a susceptibility to electrostatic charge which is opposite polarity to said susceptibility of electrostatic charge of said filter member.

8. A filter as in claim 7 wherein said liquid filter member comprises a filter base member bonded by said resin.

9. A filter as in claim 8 wherein said filter base member is composed of filter fiber bonded by said resin.

10. A filter as in claim 9 wherein said filter member is formed into a prescribed shape and said resin is impregnated therein.

11. A filter comprising:
    a case having an inlet and an outlet;
    a filter element disposed in said case;
    wherein
    said filter element comprises a liquid filter member having a susceptibility to electrostatic charge when filtering;
    wherein a resin having a susceptibility to electrostatic charge which is opposite in polarity to said susceptibility to electrostatic charge of said filter member is coated on said filter member; and
    wherein said resin is composed of a plurality of kinds having different susceptibility to electric charge.

12. A filter as in claim 11 wherein said resin is a mixture of a plurality of kinds of resin having different susceptibility to electric charge.

13. A filter as in claim 11 wherein said filter member is composed of fiber including polyester as a base material, and said resin includes melamine resin.

14. A filter as in claim 13 wherein said case is made of insulating material.

15. A filter as in claim 13 wherein said case is made of electro-conductive resinous material.

16. A filter as in claim 13 wherein said filter element is insulated from ground.

17. A filter as in claim 13 wherein said filter is used for filtering fuel.

18. A method of manufacturing a fuel filter comprising steps of:

provinding a filter member having a susceptibility to electric charge of one polarity when said filter member filters fuel;

adding resinous material having a susceptibility to electric charge of opposite polarity wherein said filter member filters fuel; and stiffening said filter element with said resinous material.

19. A method of manufacturing a fuel filter comprising the steps of:

providing a filter member having a susceptibility to electric charge of one polarity when said filler member filters fuel;

mixing a plurality of resinous materials to have said resinous material to be added thereby having a susceptibility to electric charge which can cancel said susceptibility of said filter member, wherein last said step is disposed before said step, and adding resinous material having a susceptibility to electric charge of opposite polarity when said filter member filters fuel.

20. A liquid filter comprising:

a filter element formed of non-acryl type fiber having a first polarity of susceptibility to accumulation of electrostatic charges and impregnated with a stiffening resin which has a different oppositely directed polarity of susceptibility to accumulation of electrostatic charges thereby substantially reducing static electricity otherwise caused by the friction of liquid passing through the filter element.

21. A liquid filter as in claim 20 wherein said resin includes a hydroxy group.

22. A liquid filter as in claim 20 wherein said resin includes a carboxyl group.

23. A liquid filter as in claim 20 wherein said resin includes an amino group.

24. A liquid filter as in claim 20 wherein said resin includes a plurality of functional groups chosen from the group consisting of: a hydroxy group, a carboxyl group and an amino group.

* * * * *